United States Patent [19]
Silzer et al.

[11] Patent Number: 5,249,665
[45] Date of Patent: Oct. 5, 1993

[54] BAKERY PAN CONVEYOR

[75] Inventors: Richard M. Silzer, Chesterfield; William M. Hasse, St. Charles, both of Mo.

[73] Assignee: Continental Baking Company, St. Louis, Mo.

[21] Appl. No.: 947,762

[22] Filed: Sep. 18, 1992

[51] Int. Cl.$^5$ ............................................. B65G 47/84
[52] U.S. Cl. ................... 198/803.01; 53/246; 53/250
[58] Field of Search ............... 198/431, 465.1, 465.3, 198/733, 803.01, 803.2; 53/246, 250, 251; 99/443 C

[56] References Cited

U.S. PATENT DOCUMENTS

| | | |
|---|---|---|
| 958,252 | 5/1910 | Jenkins . |
| 2,298,955 | 10/1942 | Mason et al. . |
| 2,700,939 | 2/1955 | Liston . |
| 2,938,621 | 5/1960 | Aasted . |
| 3,057,457 | 10/1962 | Johnson . |
| 3,266,616 | 8/1966 | Thomas et al. ................. 198/465.3 |
| 3,314,213 | 4/1967 | Peppler ............................. 53/246 |
| 3,809,210 | 5/1974 | Anderson . |
| 3,850,106 | 11/1974 | Krivec . |
| 3,877,386 | 4/1975 | Wakabayashi ................. 198/465.1 |
| 3,882,768 | 5/1975 | Troisi et al. . |
| 4,100,848 | 7/1978 | Grissinger . |
| 4,116,120 | 9/1978 | Kemper . |
| 4,135,872 | 1/1979 | Cerboni . |
| 4,162,723 | 7/1979 | Kupper . |
| 4,164,391 | 8/1979 | Howard et al. . |
| 4,535,687 | 8/1985 | Antpohler . |
| 4,711,166 | 12/1987 | Chen . |
| 4,767,639 | 8/1988 | Orii . |
| 4,792,298 | 12/1988 | Tastet . |
| 4,854,226 | 8/1989 | Chen . |
| 4,945,825 | 8/1990 | Florindez . |
| 5,016,528 | 5/1991 | Chen . |
| 5,077,072 | 12/1991 | Sieradzki . |

*Primary Examiner*—Joseph E. Valenza
*Attorney, Agent, or Firm*—Virgil B. Hill

[57] ABSTRACT

A conveyor for transporting bakery pans of the type including a peripheral sidewall surrounding at least one mold cavity includes an endless conveyor chain and a plurality of flight lugs extending transversely of the conveyor chain for engaging the bakery pan and moving it along an upper flight. A pan positioning attachment is secured to the conveyor at each flight lug. The attachment defines a base and a barb-like portion having an upwardly angled surface. The attachment is dimensioned to engage and retain the bakery pan in a positive fashion adjacent the flight lug.

11 Claims, 1 Drawing Sheet

BAKERY PAN CONVEYOR

BACKGROUND OF THE INVENTION

The present invention relates to bakery apparatus and, more particularly, to a bakery pan conveyor.

Commercial bakeries typically employ equipment which automates the baking of various products including bread loaves, buns and the like. For example, an existing system includes an infeed conveyor which delivers a plurality of product or bakery pans to an indexer or discontinuous conveyor. The indexer transports the pans in a stepwise fashion to a product cutter. The product cutter is located at the discharge end of a product or dough conveyor. Dough is delivered to the product cutter where it is dispensed in a measured quantity and deposited into a mold or molds defined by the bakery pan. The indexer transports the pans in coordination with operation of the cutter so that a pan is presented at the discharge end of the cutter at the appropriate time. The pans are then conveyed to an oven where the dough is baked. Subsequent operations remove the baked product from the pans, subject the pans to a cleaning operation and return the pans to the infeed conveyor.

An existing indexing conveyor includes a chain conveyor having an endless chain which extends around a pair of sprockets. A plurality of flight lugs are positioned transversely on the conveyor chain in longitudinally spaced, tandem relationship. The flight lugs, in effect, define pockets which receive the product or bakery pan. A flight lug will engage a sidewall of the pan as the pan is conveyed therealong. The flight lugs keep the pans separated properly on the conveyor. Problems have been experienced with proper loading of the pans onto the indexing conveyor and positioning of the pans thereon.

SUMMARY OF THE INVENTION

In accordance with the present invention, a bakery pan conveyor and a positioner attachment therefore are provided which prevents repeated hitting of the product pan by the flight lug on an indexing or discontinuous conveyor and which insures proper loading of the pan onto the indexing conveyor from a continuous motion conveyor. Essentially, a pan engagement means is provided which is attached or mounted on an endless conveyor at a flight lug. The engagement means retains a bakery pan on the conveyor in a positive fashion adjacent the flight lug eliminating repeated hitting of the pan by the lug and insuring proper loading of the pans onto the conveyor.

In narrower aspects of the invention, the conveyor includes an endless chain conveyor defining a flight. A plurality of flight lugs extend transversely along the flight. The flight lugs are positioned to engage a product pan deposited on the conveyor by a continuous motion infeed conveyor. The pan engagement means or attachment is a hook-like member including a base defining a leading edge and a half barbed member joined to the leading edge. The barbed member defines a sloped upper surface and a generally vertical back surface. The structure is dimensioned to define a pocket or gap between the back surface and the front surface of the flight lug. The hook member is moved into engagement with a sidewall of the product pan. The pan will ride up the sloped surface and the sidewall will drop into the gap between the flight lug and the back of the barbed member. The pan will, therefore, be retained on the conveyor in a positive fashion adjacent the flight lug. Repeated hitting of the pan due to the stepwise or indexing motion of the conveyor is eliminated. Proper loading of the pans onto the indexing conveyor is insured. Proper transfer from the constant motion conveyor to the indexing conveyor is achieved.

DETAILED DESCRIPTION OF THE PREFERRED EMBODIMENT

Figure 1:
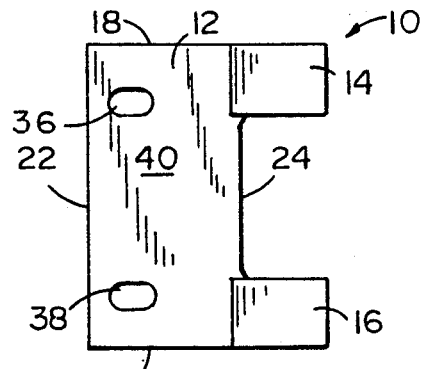
FIG. 1 is a top, plan view of a bakery pan conveyor attachment in accordance with the present invention.
Figure 2:
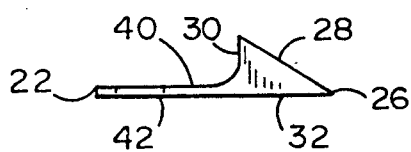
FIG. 2 is a side, elevational view thereof.
Figure 3:
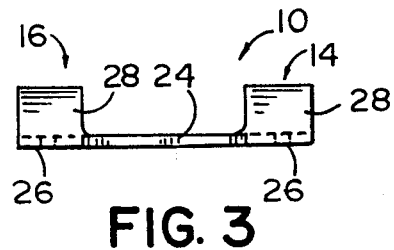
FIG. 3 is a front, elevational view thereof.

A positioner attachment for a bakery pan conveyor in accordance with the present invention is illustrated in FIGS. 1–3 and generally designated by the numeral 10. Attachment 10 includes a base 12 and a pair of half barb-like hook members 14, 16. Base 12 is generally rectangular in plan view having spaced, lateral edges 18, 20 and spaced, parallel trailing and leading edges 22, 24, respectively. Hook members 14, 16 extend outwardly from leading edge 24 and adjacent lateral edges 18, 20. As shown, each hook member includes an apex 26, an upwardly sloped surface 28, a generally vertically oriented back surface 30 and a planar, horizontal bottom surface 32.

Base portion 12 defines a pair of spaced apertures or slots 36, 38. The apertures extend through and between upper surface 40 of the base and a lower surface 42. Apertures 36, 38 provide structure for securing attachment 10 to the bakery conveyor as discussed below.

Figure 4:
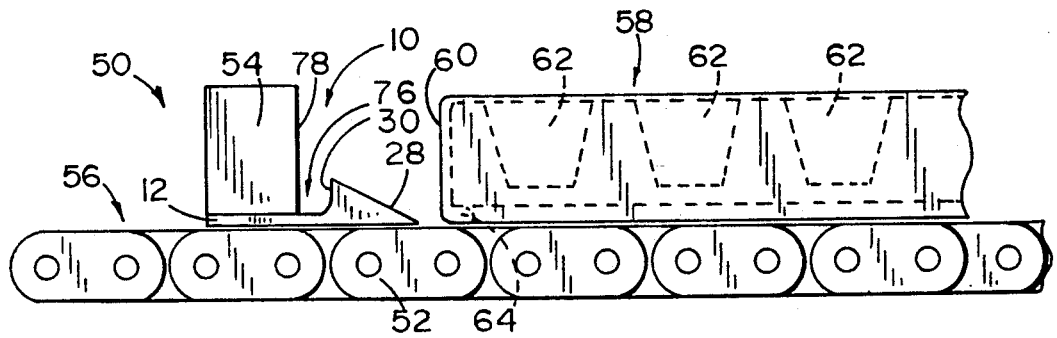
FIG. 4 is a fragmentary, side elevational view of a bakery pan conveyor including a flight lug and attachment in accordance with the present invention.
Figure 5:
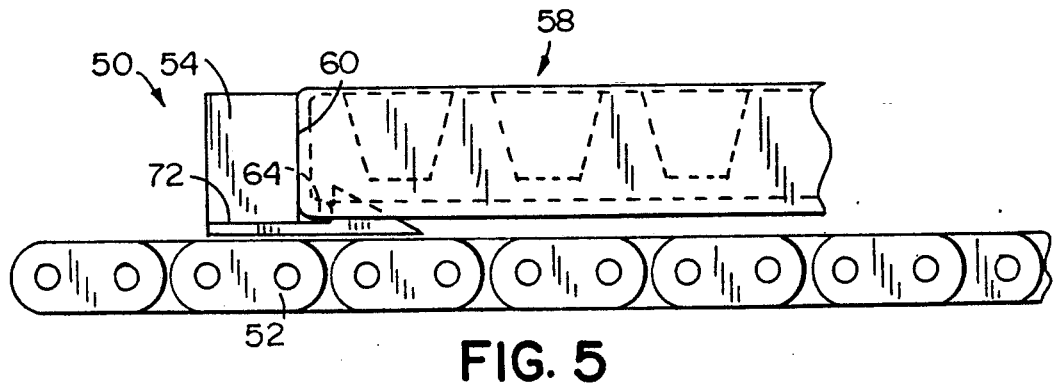
FIG. 5 is a fragmentary, side elevational view of the conveyor of FIG. 4 showing the manner in which a product or bakery pan is retained in a positive fashion.

A pan conveyor 50 in accordance with the present invention is illustrated in FIGS. 4 and 5. Conveyor 50 includes an endless chain conveyor 52 and a plurality of flight lugs 54. Flight lugs 54 extend transversely of the 10 roller chain 52 in a conventional fashion and are secured thereto along an upper flight surface 56. Roller chain 52 and the flight lugs are conventional in nature. The conveyor structure is typically used as an indexing or stepwise motion conveyor which receives product pans generally designated 58 from a continuous motion infeed conveyor (not shown).

Bakery or product pans 58 are conventional in nature. The pans include a peripheral sidewall 60 and one or more product mold cavities 62. Pans 58 include an open bottom surrounded by a horizontal, lower peripheral flange 64. When a conventional indexing conveyor receives the product pans, the flight lugs 54 would be brought into engagement with sidewall 60 and the pans would be spaced along the indexing conveyor and propelled thereby. The flight lugs, which are positioned in a spaced, tandem relationship, in effect, define pockets or areas for receipt of an individual product pan 58. The flight lugs maintain the pans in a spaced, separated fashion on the conveyor.

In accordance with the present invention, an attachment 10 is secured to each flight lug 54 at an undersurface 72 thereof. Each attachment is secured thereto by suitable fasteners (not shown) passing through apertures 36, 38 and base 12 and which are threadably received in threaded bores defined by flight lug 54. As shown, attachment 10 is dimensioned so that the vertical back surface 30 of each hook member defines a gap or pocket 76 with a front surface 78 of each flight lug 54.

In operation, product or bakery pans 58 are deposited by a continuous motion conveyor onto indexing conveyor 50. As the indexing conveyor is stepped forwardly to receive a product pan, the half barb-like or hook members 14, 16 on attachment 10 will engage the pan. The pan will ride up the sloped surfaces 28 and sidewall 60 will drop into the gap 72 defined by surfaces 30 and 78. Each pan 58 is, therefore, captured or retained in a positive fashion on the conveyor 50. Lug 54 cannot repeatedly hit or bump product pan 58 as it moves in a stepwise indexing fashion. Positive engagement and retention of the product pan 58 also insures proper loading of the pans onto the indexing conveyor. Proper pan transfer from the constant speed conveyor to the indexing or stepwise conveyor is achieved. More precise positioning of the product pans at the product cutter and dough depositing station results from the improved pan conveyor in accordance with the present invention. Attachment 10, which in conjunction with lug 54 forms the pan positioning structure, is readily added to existing pan conveyors.

In view of the above description, those of ordinary skill in the art may envision various modifications which would not depart from the inventive concepts disclosed herein. It is expressly intended, therefore, that the above should be consider as only the description of the preferred embodiment. The true spirit and scope of the present invention may be determined by reference to the appended claims.

The embodiments of the invention in which an exclusive property or privilege is claimed are defined as follows:

1. A bakery pan conveyor for conveying a bakery pan of the type having a peripheral sidewall, said conveyor comprising:
   an endless conveyor member defining an upper flight for supporting a bakery pan;
   at least one elongated flight lug extending transversely of said upper flight for engaging the bakery pan and moving the pan with said upper flight; and
   pan engagement means secured to upper flight at said flight lug for engaging and retaining the bakery pan in a positive fashion adjacent said flight lug, said pan engagement means defining a hook forming a gap with said flight lug and which is positioned to receive a sidewall of the bakery pan.

2. A bakery pan conveyor for conveying a bakery pan of the type having a peripheral sidewall, said conveyor comprising:
   an endless conveyor member defining an upper flight for supporting a bakery pan;
   at least one elongated flight lug extending transversely of said upper flight for engaging the bakery pan and moving the pan with said upper flight;
   pan engagement means at said flight lug for engaging and retaining the bakery pan in a positive fashion adjacent said flight lug; and wherein said pan engagement means comprises:
   a plate-like member including a planar base and a hook having an upwardly angled surface, said plate-like member being secured to said upper flight with the hook defining a gap with said flight lug, said gap dimensioned to receive a sidewall of the bakery pan.

3. A bakery pan conveyor as defined by claim 2 wherein said plate-like member includes another hook spaced transversely from said a hook.

4. A bakery pan conveyor as defined by claim 1 wherein said endless conveyor includes an endless roller chain, said flight lug being secured to said roller chain.

5. A bakery pan conveyor for conveying a bakery pan of the type having a peripheral sidewall, said conveyor comprising:
   an endless conveyor member defining an upper flight for supporting a bakery pan;
   at least one elongated flight lug extending transversely of said upper flight for engaging the bakery pan and moving the pan with said upper flight;
   pan engagement means at said flight lug for engaging and retaining the bakery pan in a positive fashion adjacent said flight lug, said endless conveyor including an endless roller chain, said flight lug being secured to said roller chain, and wherein said pan engagement means comprises:
   a plate-like member including a planar base and a hook having a upwardly angled surface, said plate-like member being secured to said upper flight with the hook member defining a gap with said flight lug, said gap dimensioned to receive a sidewall of the bakery pan.

6. A bakery pan conveyor as defined by claim 5 wherein said plate-like member includes another hook spaced transversely from said a hook.

7. An attachment for a pan conveyor of the type including an upper flight and at least one flight lug extending generally transversely of said flight, said attachment comprising:
   a base having a generally planar upper surface;
   a hook member on said base, said hook member defining an apex, an upwardly sloping surface and a generally vertical back surface; and
   means on said base for securing said attachment to a pan conveyor at the flight lug so that the lug and the hook member define a gap.

8. An attachment as defined by claim 7 wherein said base is generally rectangular in plan, said base defining spaced lateral sides and spaced leading and trailing edges.

9. An attachment as defined by claim 8 wherein said hook member is integral with said base and extends forwardly from said leading edge.

10. An attachment as defined by claim 9 further including another hook member integral with said base.

11. An attachment as defined by claim 10 wherein said means for securing includes an aperture extending through said base.

* * * * *